United States Patent
Fuller et al.

(10) Patent No.: US 8,292,247 B2
(45) Date of Patent: Oct. 23, 2012

(54) CABLE ANCHOR

(75) Inventors: Mark A. Fuller, Beaver, PA (US);
William F. Lang, IV, Beaver, PA (US)

(73) Assignee: Mark A. Fuller, Beaver, PA (US)

( * ) Notice: Subject to any disclaimer, the term of this patent is extended or adjusted under 35 U.S.C. 154(b) by 551 days.

(21) Appl. No.: 12/538,814

(22) Filed: Aug. 10, 2009

(65) Prior Publication Data
US 2011/0049326 A1 Mar. 3, 2011

Related U.S. Application Data

(60) Provisional application No. 61/089,241, filed on Aug. 15, 2008.

(51) Int. Cl.
*A47H 1/10* (2006.01)

(52) U.S. Cl. .......... 248/330.1; 248/332; 248/610; 73/862.321; 73/862.391; 73/862.393; 251/264; 191/12.2 R; 252/170; 252/370

(58) Field of Classification Search .......... 248/610, 248/579, 589, 602, 613, 317, 329, 330.1, 248/332, 309.1; 73/862.321, 862.328, 862.381, 73/862.391, 862.44, 862.56, 470, 862.39; 254/264, 265, 266, 278, 325; 191/12.2 R, 191/12.2 A; 242/170, 370, 570; 414/560, 414/572, 592; 267/69, 70, 73
See application file for complete search history.

(56) References Cited

U.S. PATENT DOCUMENTS

| | | | | |
|---|---|---|---|---|
| 3,056,287 A | * | 10/1962 | Gillett | 73/862.393 |
| 3,973,435 A | * | 8/1976 | Decker et al. | 73/862.393 |
| 4,040,332 A | * | 8/1977 | Border et al. | 89/37.08 |
| 4,201,113 A | | 5/1980 | Seecamp | |
| 4,217,790 A | * | 8/1980 | Lindblom | 74/470 |
| 4,372,535 A | * | 2/1983 | Gibson et al. | 254/319 |
| 4,625,947 A | * | 12/1986 | Denman et al. | 254/323 |
| 4,789,136 A | * | 12/1988 | Connelly et al. | 254/391 |
| 6,241,063 B1 | * | 6/2001 | Van Ess et al. | 191/12.2 A |
| 6,439,360 B1 | * | 8/2002 | Miller | 191/12.2 R |
| 7,151,912 B1 | * | 12/2006 | Morrison | 455/90.3 |
| 7,431,268 B2 | * | 10/2008 | Steiner et al. | 254/323 |
| 2005/0167117 A1 | * | 8/2005 | Webster et al. | 166/355 |

OTHER PUBLICATIONS

Photograph of a presently used cable anchor showing a cable secured to a block of wood, with a single spring providing tension relief.
Two photographs of a presently used cable anchor, showing the cable enclosed in an hourglass shaped structure, and a single elastomeric member providing tension relief.
Two photographs of a tire utilized as a cable anchor.
A. W. Henrie, LLC, Cable Saver brochure.

* cited by examiner

*Primary Examiner* — Ramon Ramirez
*Assistant Examiner* — Todd M Epps
(74) *Attorney, Agent, or Firm* — William F. Lang, IV; Lang Patent Law LLC (57) ABSTRACT

A cable anchor utilizes a spring assembly to reduce tensile stresses on a cable over a wide range of tensile forces. Some examples utilize a plurality of springs, with each spring sequentially acting to reduce tensile stresses on the cable as the tensile force increases. Other examples utilize a reel that permits movement of the cable through rotation of the reel to further reduce stress on the cable.

21 Claims, 6 Drawing Sheets

CABLE ANCHOR

CROSS REFERENCE TO RELATED APPLICATION

This application claims the benefit of U.S. provisional patent application Ser. No. 61/089,241, filed on Aug. 15, 2008, and having the title, "Cable Anchor."

TECHNICAL FIELD

The present invention relates to cable anchors. More specifically, the invention provides a cable anchor that cushions a tensile force applied to a cable.

BACKGROUND INFORMATION

Some electrical equipment, for example, underground mining equipment, is electrically powered using long, heavy electrical cables. As one example, a mining shuttle car used for transporting the mined substance out of the mine stores the electrical cable on a reel. The cable extends from the reel to a cable anchor mounted on the mine wall, and then to a power supply. As the shuttle car or other equipment approaches the cable anchor, the cable is wound onto the reel. As the equipment passes the cable anchor, and begins to travel away from the cable anchor, the movement of the equipment away from the cable anchor applies a tensile force to the cable, actuating a change in the direction of rotation of the reel, unwinding the cable.

Electrical cables are designed to withstand only limited amounts of tensile stress. For example, a typical electrical mining cable is rated to withstand about 200 lb. to about 600 lb. of force. As a shuttle car or other electrical vehicle passes the cable anchor, the tensile stress exerted on the cable may exceed the rating of the cable, causing premature cable wear.

Some presently available cable anchors include elastomeric bands that are intended to stretch in response to a tensile force, thereby reducing the tensile stress on the electrical cable. Other cable anchors utilize a single spring for the same purpose. These devices do not provide for stress reduction over the entire range of force to which the cable anchor may be exposed, and are themselves subject to premature wear. Additionally, many presently available cable anchors channel the cable around a reel that is too small in diameter, thereby bending the cable to a greater degree than the cable is designed to withstand.

Dual spring arrangements are known in the field of semi-automatic firearms, as explained in U.S. Pat. No. 4,204,113 to Seecamp. The spring arrangement disclosed by this patent is directed towards providing sufficient forward bias to the slide of a compact semiautomatic handgun having insufficient space for a single spring relative to the slide's distance of travel. Although the possibility of different spring rates is suggested by this patent, the patent is entirely directed towards maximizing the ability of the spring assembly to fit within the minimized available space when the spring assembly is compressed while also providing sufficient force when the spring assembly is expanded into a greater available space. Nothing within this patent discloses a means of providing tensile stress relief over a very wide range of applied tensile forces.

U.S. Pat. No. 4,040,332 to Border et al. discloses a variable spring rate equilibrator for an artillery piece. The equilibrator utilizes a pair of springs separated by a piston. A stop member prevents movement of the piston beyond a predetermined point as the artillery piece is elevated, so that only one spring is acting on the artillery piece. As the artillery piece is lowered, the piston moves away from the stop member, so that both springs can act on the artillery piece. This patent is therefore directed towards applying or removing the force of one of the two springs based on the position of the center of mass of the artillery piece, and not towards reducing a tensile stress over a wide range of applied tensile forces.

Accordingly, there is a need for a cable anchor that provides for tensile stress reduction over a greater range of tensile forces, that reduces the wear to which the cable is subjected, and which is itself durable.

SUMMARY

The above needs are met by a cable anchor having a connection for securing the cable anchor to a fixed location, a cable securing device, and a spring assembly disposed therebetween. One example of the cable anchor includes a spring assembly having a first spring having a first spring strength, and a second spring having a second spring strength. The second spring strength is higher than the first spring strength. The first spring and second springs are structured to act in a substantially parallel direction, and are also structured to bias the cable securing device towards the connection.

Another example of the cable anchor includes a connection for securing the cable anchor to a fixed location, a cable securing device, and a spring assembly disposed therebetween. The cable securing device includes a reel structured to hold the cable around its circumference. A reel housing is structured to receive the reel therein. The reel housing defines an open top that is structured to permit passage of the reel with the cable disposed thereon. The open bottom is structured to permit passage of the cable therethrough and to resist passage of the reel therethrough.

These and other aspects of the cable anchor will become more apparent through the following description and drawings.

BRIEF DESCRIPTION OF THE DRAWINGS

Like reference characters denote like elements throughout the drawings.

DETAILED DESCRIPTION

Referring to the drawings, a cable anchor 10 is illustrated. The cable anchor 10 includes a connector 12 a cable securing device 14 and a spring assembly 16 connecting the connector 12 and cable securing device 14.

Some examples of the connector 12 provide a simple aperture 18 for mounting the cable anchor 10 in a desired location, for example, an upper portion of the wall of a mine. Other examples may provide a swivel 20 to provide a greater range of motion for the cable anchor 10, so that the cable anchor 10 may pivot towards the direction of a tensile force, keeping the direction of the force substantially parallel with the cable.

Figure 3:
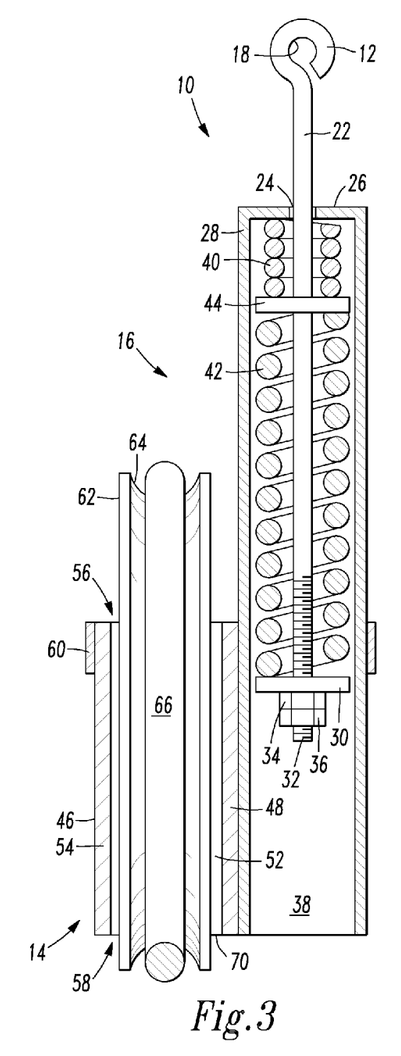
FIG. 3 is a cutaway side elevational view of the cable anchor of FIG. 1, showing the upper spring compressed and the lower spring relaxed.
Figure 4:
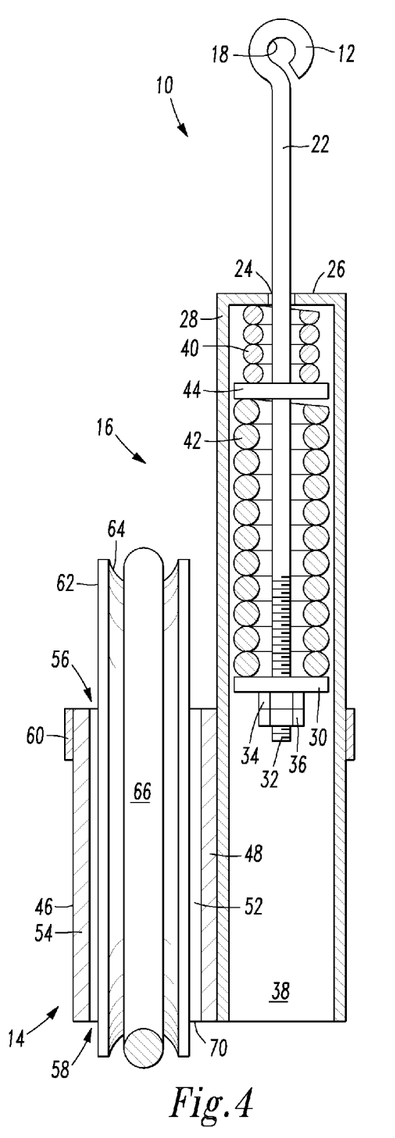
FIG. 4 is a cutaway side elevational view of the cable anchor of FIG. 1, showing both the upper spring and lower spring compressed.

Referring to FIGS. 3-4, the rod 22 extends downward from the connector 12, passing through an opening 24 defined within a top plate 26 of a generally tubular housing 28. A reciprocating plate 30 is secured to the lower end of the rod 22. In the illustrated example, a lower portion 32 of the rod 22 is threaded, so that one or more nuts 34, 36 may be used to secure the reciprocating plate 30 to the lower portion 32 of the rod 22. In the illustrated example, the nut 36 serves as a locknut to resist rotation of the nut 34, as well as to provide additional bearing surface against the threads to resist the forces applied to the reciprocating plate 30. The lower and 38 of the housing 28 may be open, facilitating access to the nuts 34, 36 and reciprocating plate 30.

A plurality of springs are contained within the housing 28. In the illustrated example of FIGS. 1-4, a pair of springs 40, 42 are illustrated. The rod 22 passes through each of the springs 40, 42. A spring dividing plate 44 separates the spring 40 from the spring 42, with the rod 22 passing through a suitable opening with the spring dividing plate 44. The spring dividing plate 44 is free to slide along the rod 22. The springs 40, 42 are selected to compress over different ranges of compression forces. In the illustrated example, the spring 40 is structured to compress over a lower range of forces, for example, about 100 lb. to about 500 lb. of force, and the spring 42 is structured to compress over a higher range of forces, for example, about 450 lb. to about 1,300 lb. of force. Other spring arrangements are possible. As one alternative, the location of the springs 40, 42 may be reversed. Alternatively, more than two springs may be used, and the springs may be positioned within the housing 28 in any order. In other alternative examples, two or more of the springs may be nested, with the weaker spring being longer than the stronger spring to ensure that the weaker spring undergoes substantial compression before the stronger spring begins to compress.

Figure 5:
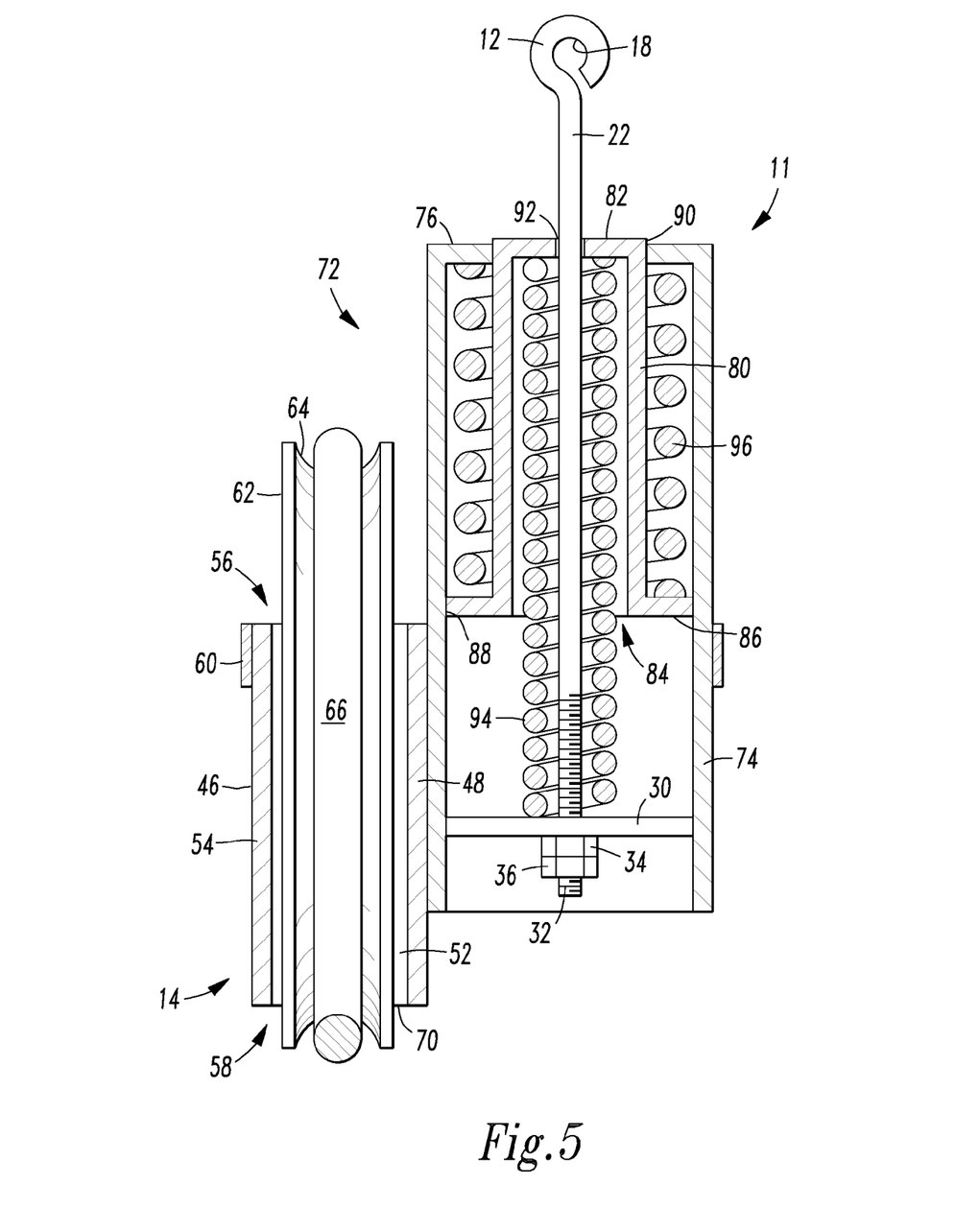
FIG. 5 is a cutaway side elevational view of an alternative cable anchor, showing the inner and outer springs relaxed.
Figure 6:
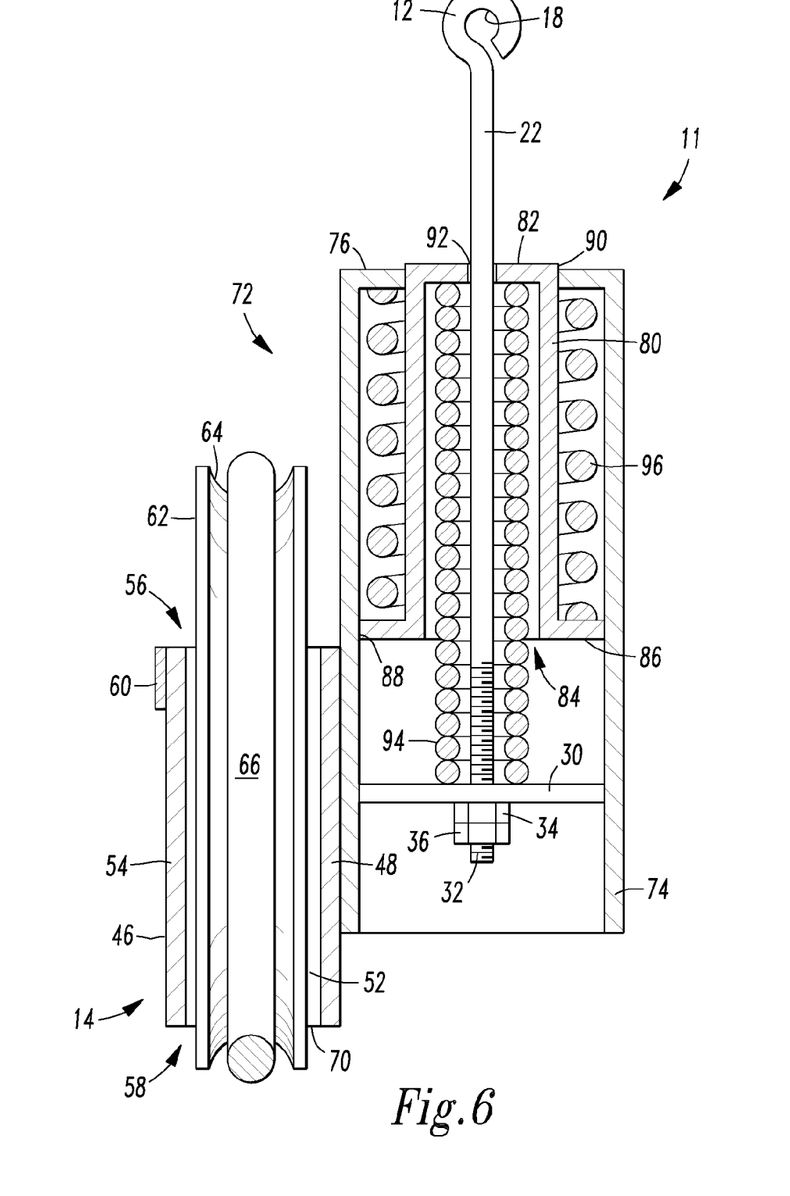
FIG. 6 is a cutaway side elevational view of an alternative cable anchor, showing the inner spring compressed and outer spring relaxed.
Figure 7:
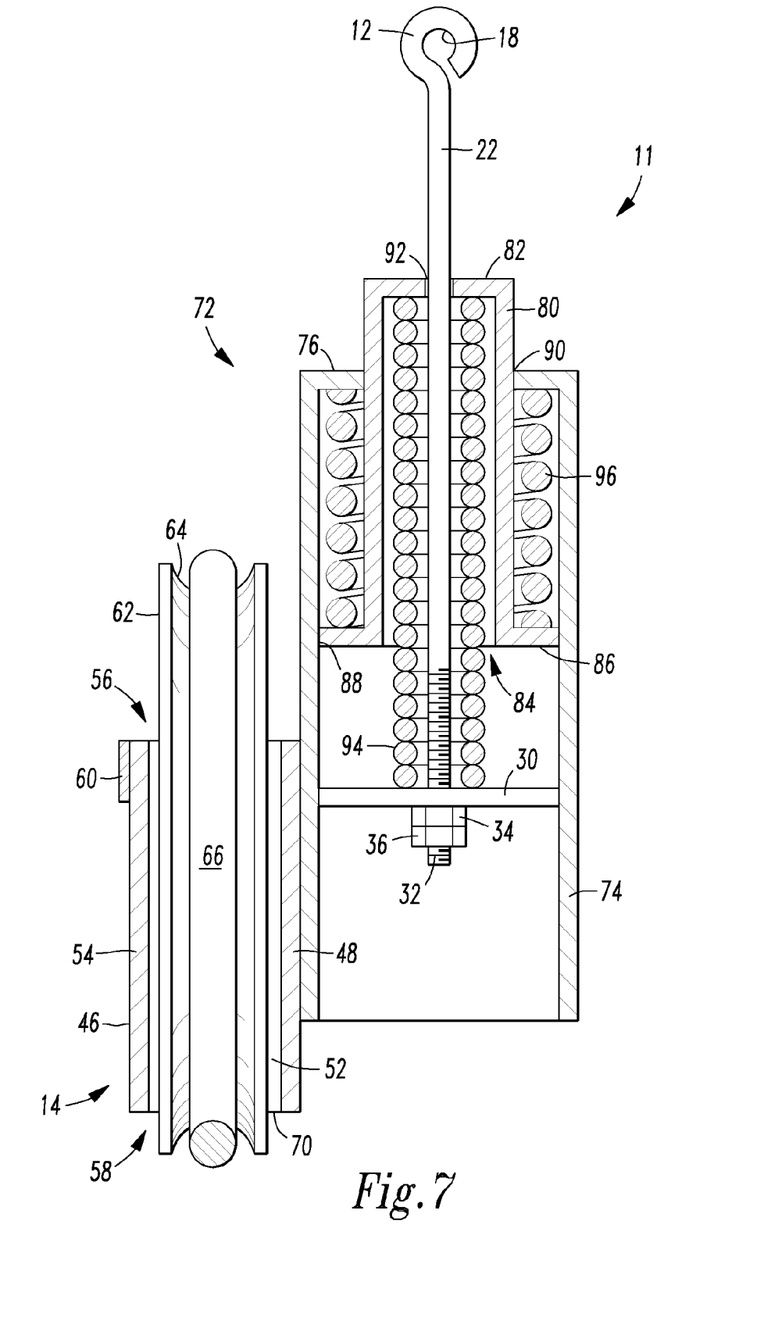
FIG. 7 is a cutaway side elevational view of an alternative cable anchor, showing the inner and outer springs compressed.

An example of a cable anchor 11 having a spring assembly 72 utilizing nested springs is illustrated in FIGS. 5-7. The spring assembly 72 includes a generally tubular housing 74 having a top wall 76 and an open bottom 78. A coupling sleeve 80 is slidably mounted within the housing 74. The coupling sleeve 80 is generally tubular, having a closed top end 82 and an open bottom end 84. The bottom end 84 includes an outwardly extending circumferential flange 86 having an outer edge 88 that is adjacent to or abuts the inner surface of the tubular housing 74. An opening 90 defined within the top wall 76 is structured to receive the coupling sleeve 80. As before, a rod 22 extends downward from the connector 12, passing through an opening 92 defined in the top end 82 of the coupling sleeve 80. A reciprocating plate 30 is secured to the lower end of the rod 22. In the illustrated example, a lower portion 32 of the rod 22 is threaded, so that one or more nuts 34, 36 may be used to secure the reciprocating plate 30 to the lower portion 32 of the rod 22. In the illustrated example, the nut 36 serves as a locknut to resist rotation of the nut 34, as well as to provide additional bearing surface against the threads to resist the forces applied to the reciprocating plate 30. The open end 78 of the housing 74 facilitates access to the nuts 34, 36 and reciprocating plate 30.

A pair of springs 94, 96 are contained within the illustrated example of the spring assembly 72. The inner spring 94 surrounds the rod 22, extending from the reciprocating plate 30, into the coupling sleeve 80, and ends adjacent to the top end 82 of the coupling sleeve 80. The outer spring 96 surrounds the coupling sleeve 80, extending from the top wall 76 of the housing 74 to the circumferential flange 88 of the coupling sleeve 80. The inner spring 94 and outer spring 96 are selected to compress over different ranges of compression forces. In the illustrated example, the inner spring 94 is structured to compress over a lower range of forces, for example, about 100 lb. to about 500 lb. of force, and the outer spring 96 is structured to compress over a higher range of forces, for example, about 450 lb. to about 1,300 lb. of force. In other examples, the spring compression forces may be reversed, so that the outer spring is structured to compress prior to compression of the inner spring.

Figure 1:
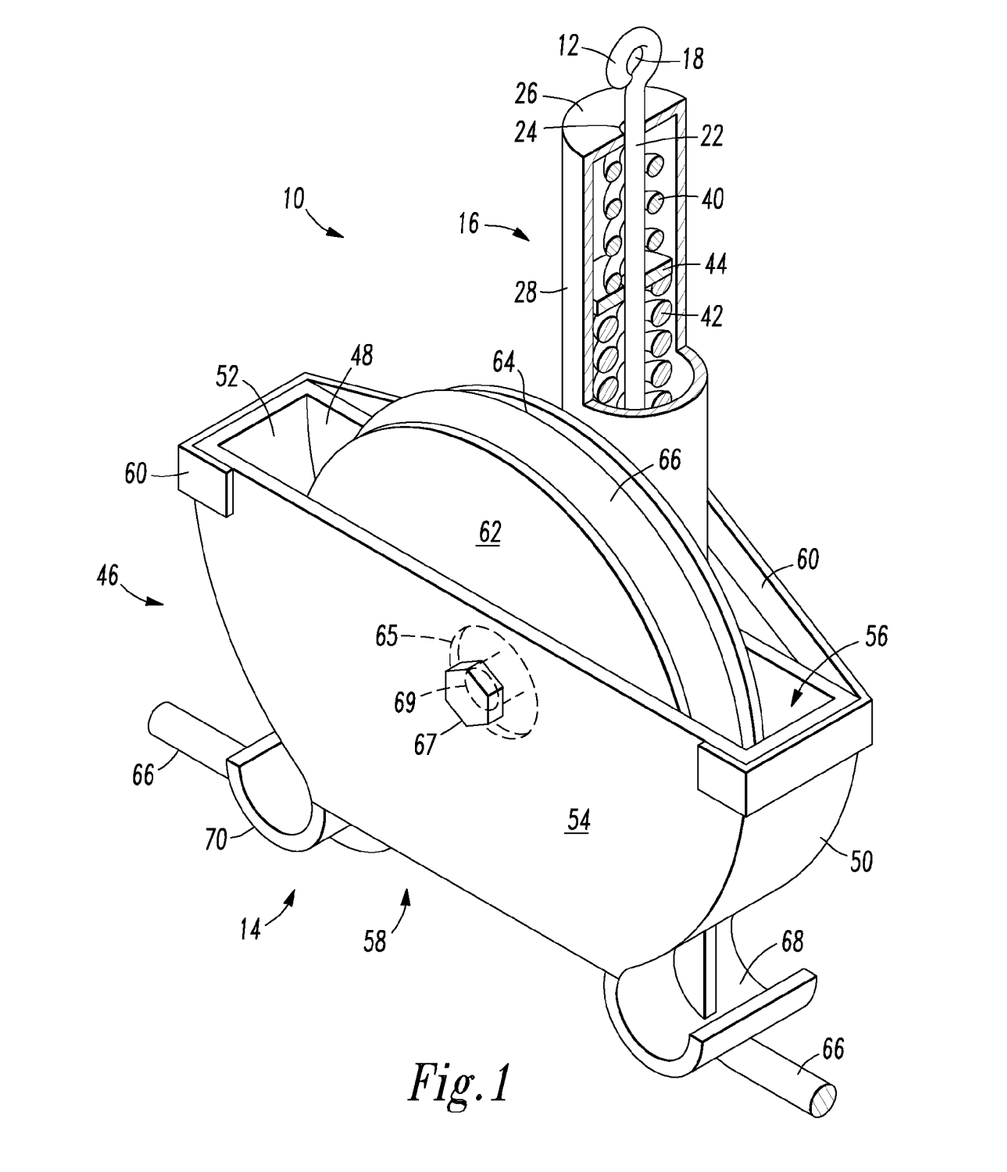
FIG. 1 is a partially cutaway isometric front view of a cable anchor.
Figure 2:
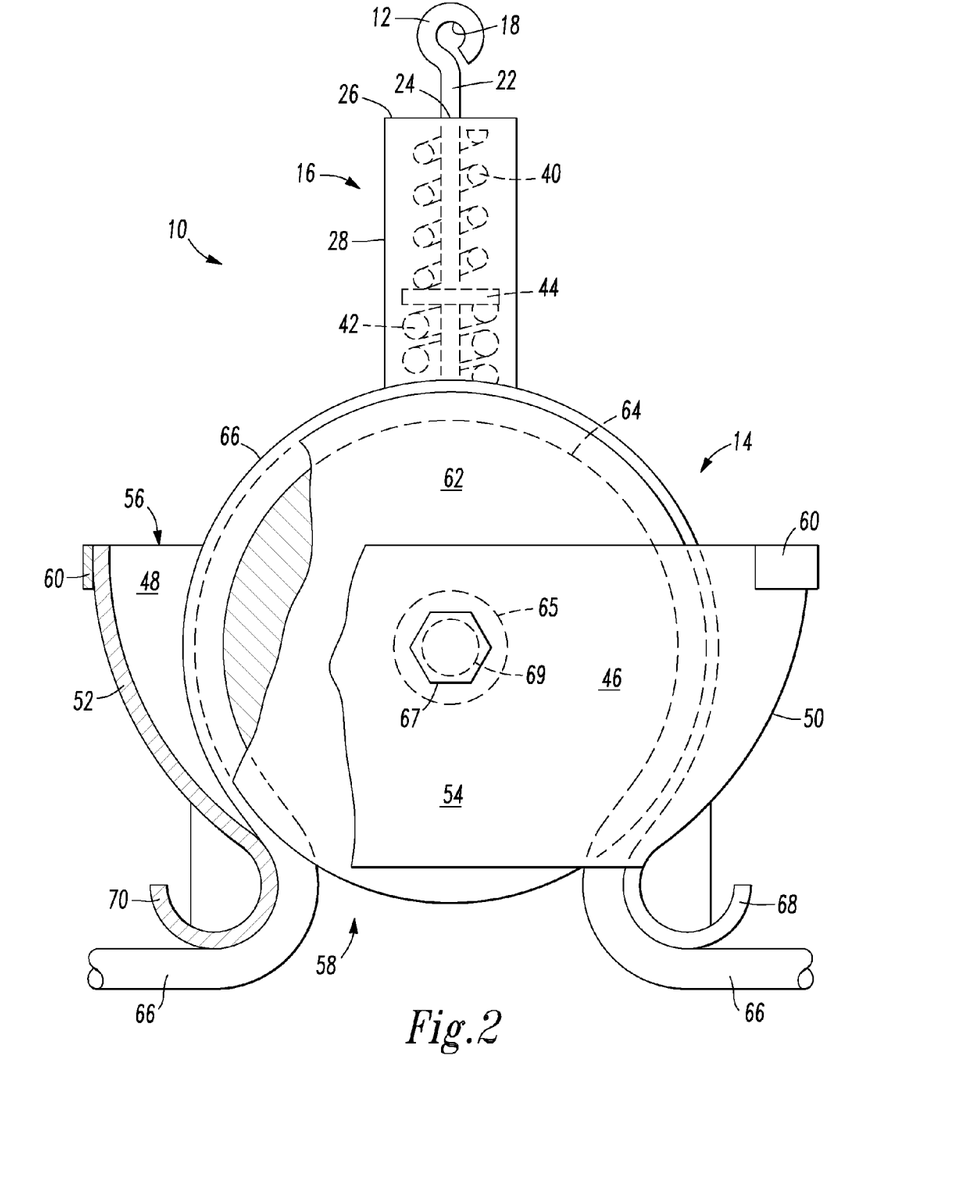
FIG. 2 is a partially cutaway front elevational view of the cable anchor of FIG. 1.

Referring to FIGS. 1-2 as well as FIGS. 3-4, a reel housing 46 is secured to the tubular housing 28. In the illustrated example, the reel housing 46 is secured to the lower portion of the tubular housing 28. The reel housing 46 includes a rear wall 48 directly abutting the tubular housing 28. A pair of convex side walls 50, 52 extending outward from either end of the rear wall 48. A front wall 54 connects the side walls 50, 52 opposite the rear wall 48. The reel housing 46 is generally tapered, narrowing from top to bottom. The bottom edges of the side walls 50, 52 include radiused portions 68, 70, having a sufficiently large radius to resist damage to a cable resulting from severe bending. The top of the reel housing 46 defines a top opening 56. Likewise, the bottom of the reel housing 46 defines a bottom opening 58. The rear wall 48 of the reel housing 46 may be secured to the tubular housing 28 by welding, or by appropriate mechanical fasteners. Additionally, the straps 60 may extend around the tubular housing 28 and reel housing 46 to further secure the tubular housing 28 to the reel housing 46.

A reel 62 is disposed within the reel housing 46. The reel 62 has a diameter sufficiently large that the reel will not get through the bottom opening 58, and sufficiently small so that the reel 62 will fit through the top opening 56. The reel 62 also has a sufficiently large diameter so that, when a cable is channeled around the reel 62, the cable is not bent beyond the design specifications of the cable. Some examples of the reel 62 are at least about 9 inches in diameter. The reel 62 defines a circumferential channel 64, structured to receive an electrical cable 66 therein. In the illustrated example, referring specifically to FIG. 2, the electrical cable 66 extends upward through the opening 58, around a circumferential channel 64 of the reel 62, and down through the opening 58. With the cable 66 in place, the reel 62 is held within the reel housing 46 by gravity and by any tensile forces applied to the cable 66. In some examples, a hole 65 may be provided in the reel 62. A bolt 67 may pass through the hole 65 in the reel, and the hole 69 in the reel housing 46. Although the hole 69 matches the diameter of the bolt 67, the hole 65 is significantly larger in diameter than the bolt 67, permitting some movement of the reel 62 with respect to the housing 46.

In the illustrated example, the tubular housing 28, reel housing 46, reciprocating plate 30, spring dividing plate 44, rod 22, and strap 60 are made from steel. Other metals may be used provided that they have sufficient strength. The reel 62 may be made from any suitable metal, or from suitable polymers, for example, polyurethane.

In use, the cable anchor 10 or 11 is secured to an appropriate location, for example an upper portion of a mine wall, using the connector 12. With the reel 62 outside of the reel housing 46, the cable 66 is extended from the mine shuttle car (or other equipment) upward through the opening 58, around the reel 62, and then down through the opening 58. The cable 66 is then extended towards and connected to an appropriate power supply. The cable 66 and reel 62 are then lowered into the housing 46. At this point, friction between the cable 66 and the bottom edges of side walls 50, 52 respectively resists rotation of the reel 62, without totally preventing all rotation of the reel 62.

At rest, the cable anchor 10 will be in the configuration illustrated in FIGS. 1 and 2. In this condition, both the spring 40 and spring 42 are relaxed. As a shuttle car or other equipment passes the cable anchor 10, a downward force is applied to the cable 66. As this force increases beyond the minimum strength needed to compress the spring 40, spring 40 begins to compress, until it reaches the configuration illustrated in FIG. 3. Before the spring 40 reaches full compression, the increasing force applied to the cable 66 causes the spring 42 to begin to compress. The spring 42 continues to compress until the maximum force is reached, or until the spring 42 is fully compressed, as illustrated in FIG. 4. As the shuttle car passes the cable anchor 10, the reel within the shuttle car reverses direction, reducing the tension on the cable 66 and returning the cable anchor 10 to the configuration of FIG. 3 and then to the configuration of FIGS. 1-2.

Likewise, the cable anchor 11 of FIGS. 5-7 will begin in the configuration of FIG. 5, with both the inner spring 94 and outer spring 96 relaxed. As a shuttle car or other equipment passes the cable anchor 11, a downward force is applied to the cable 66. As this force increases beyond the minimum strength needed to compress the inner spring 94, the inner spring 94 begins to compress, until it reaches the configuration illustrated in FIG. 6. Before the inner spring 94 reaches full compression, the increasing force applied to the cable 66 causes the outer spring 96 to begin to compress, causing the coupling sleeve 82 slide upward within a housing 74. The outer spring 96 continues to compress until the maximum force is reached, or until the outer spring 96 is fully compressed, as illustrated in FIG. 7. As the shuttle car passes the cable anchor 11, the reel within the shuttle car reverses direction, reducing the tension on the cable 66 and returning the cable anchor 11 to the configuration of FIG. 6 and then to the configuration of FIG. 7.

Regardless of whether the cable anchor 10 or the cable anchor 11 is used, the reel 62 may rotate to a small degree against the friction between the cable 66 and bottom edges 68, 70 of the walls 50, 52, thereby permitting the cable to move a small distance towards the direction of the tensile force, further reducing the tensile stress on the cable 66.

A variety of modifications to the above-described embodiments will be apparent to those skilled in the art from this disclosure. Thus, the invention may be embodied in other specific forms without departing from the spirit or essential attributes thereof. The particular embodiments disclosed are meant to be illustrative only and not limiting as to the scope of the invention. The appended claims, rather than to the foregoing specification, should be referenced to indicate the scope of the invention.

What is claimed is:
1. A cable anchor, comprising:
a connection for securing the cable anchor to a fixed location;
a cable securing device; and
a spring assembly connecting the connection and the cable securing device, the spring assembly comprising:
a first spring having a first spring strength; and
a second spring having a second spring strength, the second spring strength being greater than the first spring strength, the first spring and second spring being structured to act in substantially parallel directions, the first spring and second spring being structured to bias the cable securing device towards the connection;
whereby movement of the cable securing device away from the connection first compresses the first spring, and then begins to compress the second spring while the first spring is at least partially compressed from the movement of the cable securing device.

2. The cable anchor according to claim 1, wherein the first spring and second spring are aligned along substantially a same axis of movement.

3. The cable anchor according to claim 2, wherein the first spring and second spring are sequentially aligned along their axis of movement.

4. The cable anchor according to claim 2, wherein the first spring and second spring are nested.

5. The cable anchor according to claim 4, wherein the first spring and second spring are wound in opposing directions.

6. The cable anchor according to claim 4, wherein the second spring has a shorter uncompressed length than the first spring.

7. The cable anchor according to claim 6, further comprising a coupling sleeve disposed between the first spring and the second spring.

8. The cable anchor according to claim 1, further comprising:
a generally tubular housing encasing the first spring and second spring, the generally tubular housing having an open end and a closed end, the closed end having an end plate with a central opening defined therein;
a rod extending through the generally tubular housing, the first spring, and the second spring, the rod passing through the central opening and defining a connection end disposed outside the generally tubular housing, the connection being disposed at the connection end, the rod further defining a free end; and
a reciprocating plate disposed on the free end of the rod, whereby the first spring and second spring are disposed between the end plate of the generally tubular housing and the reciprocating plate.

9. The cable anchor according to claim 8, wherein the reciprocating plate is removably secured to the rod.

10. The cable anchor according to claim 8, wherein the first spring and second spring are sequentially aligned along their axis of movement.

11. The cable anchor according to claim 8, wherein the first spring and second spring are nested.

12. The cable anchor according to claim 11, wherein the first spring and second spring are wound in opposing directions.

13. The cable anchor according to claim 11, wherein the second spring is shorter than the first spring.

14. The cable anchor according to claim 1, wherein the cable securing device comprises:
a reel structured to hold a cable around its circumference; and
a barrier structured to hold the cable on the reel, the barrier having a front wall, a rear wall opposite the front wall, and a pair of opposing side walls, the barrier defining a top opening that is structured to permit passage of the reel therethrough, the barrier further defining a bottom opening structured to permit passage of a cable therethrough and to resist passage of the reel therethrough.

15. The cable anchor according to claim 14, wherein two opposing walls of the barrier is structured to apply a frictional force to the cable, thereby resisting rotation of the reel.

16. The cable anchor according to claim 14, wherein the reel has a diameter of at least about 9 inches.

17. A cable anchor, comprising:
a connection for securing the cable anchor to a fixed location;
a cable securing device;
a spring assembly connecting the connection and the cable securing device, the spring assembly comprising:
a first spring having a first spring strength; and
a second spring having a second spring strength, the second spring strength being greater than the first spring strength, the second spring being shorter than the first spring, the first spring and second spring being structured to act in substantially parallel directions, the first spring and second spring being structured to bias the cable securing device towards the connection;
a generally tubular housing encasing the first spring and second spring, the generally tubular housing having an open end and a closed end, the closed end having an end plate with a central opening defined therein;
a rod extending through the generally tubular housing, the first spring, and the second spring, the rod passing through the central opening and defining a connection end disposed outside the generally tubular housing, the connection being disposed at the connection end, the rod further defining a free end;
a reciprocating plate disposed on the free end of the rod, whereby the first spring and second spring are disposed between the end plate of the generally tubular housing and the reciprocating plate; and
a coupling sleeve disposed between the first spring and the second spring, the coupling sleeve being slidably mounted within the tubular housing, the coupling sleeve having a top wall structured to abut an end of the first spring, and a circumferential bottom flange structured to abut an end of the second spring, the coupling sleeve being biased in a first direction by the first spring, and the coupling sleeve being biased in a second direction by the second spring;
whereby movement of the cable securing device away from the connection first compresses the first spring, and then begins to compress the second spring after the first spring has already undergone at least some compression.

18. A cable anchor, comprising:
a connection for securing the cable anchor to a fixed location;
a cable securing device, comprising:
a reel structured to hold a cable around its circumference; and
a cable housing structured to receive the reel therein, the cable housing having a front wall, a rear wall opposite the front wall, and a pair of opposing side walls, each of the opposing side walls defining a bottom cable engaging surface; the cable housing defining a top opening that is structured to permit passage of the reel therethrough, the cable housing further defining a bottom opening structured to permit passage of a cable therethrough and to resist passage of the reel therethrough, the bottom cable engaging surfaces being disposed adjacent to opposing ends of the bottom opening, the cable housing defining an open top that is structured to permit passage of the reel with a cable disposed thereon therethrough, and an open bottom that is structured to permit passage of the cable therethrough and to resist passage of the reel therethrough; and
a spring assembly connecting the connection and the cable securing device; whereby a downward force on the cable pulls the cable and reel towards the bottom opening, causing the cable to be pinched between the reel and each of the bottom cable engaging surfaces, thereby creating a pair of frictional forces on the cable that resist movement of the cable through the cable anchor.

19. The cable anchor according to claim 18, wherein the open bottom of the cable housing and reel are structured to apply a frictional force to the cable, thereby resisting rotation of the reel.

20. The cable anchor according to claim 19, wherein the frictional force that resists rotation of the reel is not sufficient to totally eliminate rotation of the reel.

21. The cable anchor according to claim 18, wherein the reel has a diameter of at least about 9 inches.

* * * * *